United States Patent Office 3,726,689
Patented Apr. 10, 1973

3,726,689
ANIMAL FOOD FROM RAW WHOLE FISH
Max Patashnik, Kirkland, Wash., assignor to the United States of America as represented by the Secretary of the Interior
No Drawing. Filed Nov. 18, 1970, Ser. No. 90,806
Int. Cl. A22c 25/20; A23k 1/10
U.S. Cl. 99—3
1 Claim

ABSTRACT OF THE DISCLOSURE

Raw whole fish is coarsely ground to hamburger-like consistency while NaCl is added to the fish to salinize its aqueous content in order to influence solubilization of myofibrillar protein. The "hamburger" is then passed through a colloid mill to form a paste-like emulsion containing dissolved protein and dispersed globules of fish fat. Dissolved protein is then coagulated to gel the emulsion into a product suitable as animal food or bait.

---

This invention relates to the production of animal food and bait from raw, whole fish.

Small cetaceans (e.g., porpoises, dolphins) and all pinnipeds (e.g., seals) eat primarily fresh fish. However, due to the perishable nature and limited storage life of fresh fish, it is undesirable as a regular food for such captive animals. Further, raw fish food is a potential health hazard to such animals because of the occasional presence of infectious microorganisms or parasites. Accordingly, there is great interest in a stable pasteurized food ration which will be readily accepted by the animals. Heretofore, so far as is known, a ration of this nature for porpoises and other marine mammals has not been discovered.

We have now developed such a product and a process for producing the same. Generally, the product is composed of a protein gel consisting of all the ingredients in a raw, whole fish plus a salt selected from the group consisting of NaCl, KCl and mixture thereof. Water-holding, coagulated myofibrillar protein is the basic gel constituent. Homogeneously dispersed therein are (1) globules of the oil (fat) fraction of the whole fish, and (2) particles of all the other fish constituents and said salt, which particles range in size from ordinary matter ($>10^{-5}$ cm.) through colloidal ($10^{-7}$ cm.–$10^{-5}$ cm.) to true solutions ($<10^{-7}$ cm.).

To produce such a ration, the aqueous fraction of the fish must first be salinized by the addition of said salt, in which environment myofibrillar protein in the fish is soluble. The fish is finely comminuted so that myofibrillar proteinaceous matter in the fish more readily dissolves in the aqueous fraction. In this dissolved state the protein acts as a surfactant or emulsifying agent whereby globules of the oil fraction of the fish can be dispersed in the aqueous fraction to form an emulsion. Once the emulsion is formed, dissolved myofibrillar protein in the continuous aqueous phase is coagulated to form a gel. Despite the presence of viscera, skin and other waste portions of the fish, a suitable emulsion and a final gel product are formed from the whole fish. To eliminate potential health hazards and to increase its storage life, the gel product can be pasteurized. By proper control of the process variables, the final product can be prepared to have the textural elasticity of fresh, whole fish, and to float on water.

It is therefore an object of the present invention to form a readily acceptable, stable animal food and bait from raw, whole fish.

Another object is to prepare such a ration that is particularly suitable for porpoises and other marine mammals.

A still further object is to prepare such a ration which is similar in texture to fresh, whole fish.

Other objects and advantages will be obvious from the following more detailed description of the invention.

In the practice of the invention, NaCl, KCl, or mixtures thereof, is added to the aqueous fraction of the fish preferably by coarsely grinding the raw, whole fish, in the presence of the salt, to a substantially homogeneous mass having a hamburger-like consistency. The salt is incorporated in amounts heretofore employed (during production of protein gels) in the formation of proteinaceous saline solutions from salt-soluble proteins. Preferably, it is added in an amount of about 0.5 to 3.0 weight percent of the raw whole fish. A food-type screw plate grinder having holes of ⅛ to ⅜ inches and/or a silent cutter-type machine is suitable for this coarse grinding operation. Alternatively, the water can first be extracted from the fish in the prior art manner, and then the salt added thereto, provided that the emulsifying and coagulating properties of the myofibrillar protein are retained during water extraction.

To dissolve myofibrillar fish protein in the now-silane aqueous fraction of the fish while essentially simultaneously homogeneously suspending and dispersing the oil fraction of the fish in the aqueous fraction along with all the other fish constituents, the "hamburger" is passed through an emulsifying apparatus or colloid mill as, for example, those machines discussed in Perry's Chemical Engineers Handbook, 4th ed., 1963, McGraw-Hill, page 8–14, column 1, 4th full paragraph. Such a machine comminutes fish solids to colloidal size, and thereby enables myofibrillar protein to rapidly go into solution in the aqueous phase, and to act as a surfactant or emulsifying agent therein. During such comminution, globules of fish oil are formed and become dispersed in the aqueous phase. Further, all the other fish constituents become homogeneously dispersed in the resultant paste-like emulsion.

In some instances (in the absence of fish bone problems), coarse grinding, fine comminution, and emulsification can be simultaneously accomplished in a silent cutter apparatus.

Alternatively, if the water and oil fractions are removed in the prior art manner from the fish prior to passage through a colloid mill, the resultant oil- and water-free fish fraction can be finely comminuted by itself, and then mixed with the oil and water fractions to form an emulsion, provided that the surfactant and coagulation properties of the myofibrillar protein are unaltered by the water and oil removal step or steps.

Prior to packaging the emulsion for the purpose of gel formation, the paste-like emulsion can be further subject to comminution by, for example, mincing in a food-type mixer or blender to maximize homogeneity and elasticity of the final product.

During the steps of coarse grinding, emulsification, and final mincing, it is important that the operating temperatures be maintained low enough to prevent premature coagulation or gelling of the myofibrillar protein. These temperatures may vary considerably from one operation to another depending on such factors as the fish species, duringe of the fish, the time of catch, the bone load, etc. Generally speaking, during coarse grinding the temperature of the feed and product should be maintained below about 40° F, preferably about 20° F.– 35° F.; and during emulsification and final mincing these temperatures generally should be below about 60° F.

Once the emulsion is formed, it is gelled or coagulated. This can be accomplished in a plurality of ways depending upon the particular feed material and the desired use of the end product. The particular gelation technique is best determined experimentally in each case. Generally, some emulsions can be sufficiently gelled by storing for several hours at a temperature of 32° F. to about 70° F. Others require heat (e.g., 80°–140° F.) for gelation. Some emulsions can be preliminarily gelled at lower temperatures, but then must be heat set at elevated temperatures. In many instances, heating accelerates coagulation; and thus immediately after formation of the emulsion, it can be heat coagulated at elevated temperatures or it can be stored a few hours at 32° F.–70° F. for preliminary coagulation and then heat coagulated.

Pasteurization of sterilization of the product is important if the long range normal health of the food recipient is of interest. Pasteurization is accomplished generally by heating the gelled material with water or steam so that a temperature of about 180° F. is obtained at the center of the product for at least 30 minutes. In some instances, the pasteurization step also serves as a heat setting step for a preliminarily gelled emulsion, while in other instances the emulsion, in an ungelled state, can be simultaneously pasteurized and completely coagulated. The temperature of the pasteurization heating medium can vary from about 180° F. to 250° F. to effect, as desired, slow or rapid pasteurization (and, perhaps, gelation or heat setting). Sterilization may be achieved by conventional methods by extension of pasteurization.

After pasteurization, the product is cooled at about 32° F.–70° F. and then stored under refrigeration conditions for future use. To insure against spoilage and to maximize the retention of textural and cohesive properties of the product, it is best frozen and stored at about 0° F. or lower if it is not to be used within 4 weeks.

In its basic form the gel product after emulsification will float on water. However, by agitating the emulsion, prior to gelation, in a high speed blender or vertical type cutter, it can be substantially deaerated and made nonfloatable.

If desired, additives can be incorporated in the product before, during or immediately after emulsification. In this manner, the texture and flavor can be modified so as to optimize animal or species acceptance. Such additives include additional water, supplemental surfactants, gelling agents and water-retention agents to modify the elastic and cohesive properties of the product such as corn starch, potato starch; antioxidants and other spoilage inhibitors; food supplements; stabilizing, thickening, and/or texturizing agents such as natural and artificial gum-type materials (e.g., carboxymethylcellulose); compounds such as methyl and ethyl sulfide, and whole portions or segments of species such as squid, crab, shrimp, cod, salmon, etc., to make the food ration more attractive to feeding animals; supplemental fish oils and other oils as an energy source or as attractants.

The resultant texturally elastic and cohesive properties contributed to the present invention by the myofibrillar proteinaceous flesh portion of the fish are unique to each fish species. These properties are adversely affected at different rates for each species as functions of such factors as storage, storage age of the fish, the time of the year the fish are caught, and the area of the catch. Uniformity of these properties and control thereover can be attained by incorporation of some of the above-mentioned additives in predetermined quantities.

Water-retention and texturizing agents such as sodium tripolyphosphate, sodium pyrophosphate or combinations thereof are particularly important, and impart improved textural properties to the product. Preferably, such agents are incorporated in an amount of about 0.05 to 0.6 weight percent of the product.

In some instances wherein it is desirable to obtain a purified food ration, and wherein processing costs are not a major factor, it may be desirable to remove viscera, skin and other waste portions of the whole fish prior to treatment by the process of the present invention.

The salt content of the final product may vary somewhat from the amount of salt added to the fish during processing. This is due to the fact that as much as 0.5 weight percent of salt equivalent may be naturally contained in the fish. Furthermore, the removal of certain waste portions of the fish prior to processing or the inclusion of significant amounts of additives will change the weight percent of the salt. Generally, the salt content of the final product will be about 1.0 to 3.5 weight percent.

In tests to date many species of fish, including underutilized fish, have been converted to the product of the present invention, including rockfish (*Sebastodes melanops, S. brevispinus, S. flavidus, S. pinneger*), herring (*Clupea pallasi*), Puget Sound hake (*Merluccius productus*), and blueshark (*Pironace glauca*).

The following examples illustrate the process of the present invention:

EXAMPLE 1

15 pounds of frozen herring caught at Puget Sound, Wash., was ground to somewhat finer than hamburger-like consistency in a silent cutter in the presence of 1.0, 0.2, and 1.7 weight percent respectively of NaCl, and sodium tripolyphosphate and water. The temperature of the ground product was maintained below 40° F. Next it was passed through an orifice type colloid mill, the feed and product being maintained below 55° F. Thereafter the resultant paste was minced by a food-type blender for 2 minutes while being maintained below 60° F. Next, the product was stored overnight at 34° F. Pasteurization was then accomplished with steam (180° F.–190° F.). After storing in a refrigerator for 21 days at 34° F., the product was offered to a captive female killer whale and readily accepted.

EXAMPLE 2

3 pounds of prerigor frozen herring caught at Puget Sound was ground to somewhat finer than hamburger-like consistency for 8 minutes in a silent cutter without the addition of salt. Samples of this ground material were periodically removed. The remainder was then additionally ground for up to 9 minutes in the same device in the presence of 1.0 weight percent NaCl samples again were periodically removed. The temperature was maintained below 44° F. during all the grinding steps. All sample products were stored overnight at 34° F. They were then pasteurized at 180°–190° F. with hot water and again stored overnite at 34° F. The sample prepared without the addition of salt exhibited poor cohesiveness and was texturally unacceptable as crab bait. The samples to which NaCl had been added and which were additionally ground for up to 3 minutes also were unsuitable as bait. Those samples to which NaCl had been added and which were additionally ground for 4 to 9 minutes exhibited excellent floatability and adequate cohesiveness to serve as crab bait.

Not only is the uniform and homogeneous product of the present invention acceptable to captive porpoises and other marine mammals, it is also suitable as food for other aquatic species held in zoos, aquaria and hatcheries. Further, it is attractive as bait to commercial fish species. For example, it has been effectively employed to catch Dungeness crabs. Such crabs are usually caught with expensive bait (razor clams and squids) often not readily available. Further, it has been effectively employed in trap fishing to catch sable fish. Additionally, due to the product's cohesiveness and elasticity, it can be formed, sliced, diced or cubed into convenient sub-unit size for feeding. When its use is as a bait, the product has the added advantage that its distintegration rate and flavor-odor attractant capabilities can be controlled, as desired, by inclusion of specific additives and/or by selected variation of the emulsifying and/or gelation steps. Other advantages of the present invention include the fact that a ready market for underutilized fish species is provided. Still further, certain waste portions of fish can be utilized by incorporating such wastes in the gel product as attractants.

What is claimed is:

1. A process for producing animal food from all the ingredients of raw whole fish selected from the group consisting of rockfish, herring, hake and blue shark, comprising:
  (a) adding a chloride salt selected from the group consisting of NaCl, KCl and mixtures thereof in an amount of about 0.5 to 3.0 weight percent of said whole fish;
  (b) coarsely grinding said whole fish to a substantially homogeneous mass at a temperature below 40° F. in the presence of said chloride salt;
  (c) adding as an ingredient a salt selected from the group consisting of sodium tripolyphosphate, sodium pyrophosphate and mixtures thereof;
  (d) passing said homogeneous mass through a colloid mill at a temperature below 60° F. to form an emulsion;
  (e) homogenizing said emulsion at a temperature below 60° F.;
  (f) gelling said emulsion at a temperature of about 32° F.–140° F. to form a protein gel;
  (g) heat pasteurizing said protein gel at a temperature of about 180° F.–250° F.; and
  (h) cooling the pasteurized gel to about 32° F.–70° F.

References Cited

UNITED STATES PATENTS

| Number | Date | Name | Class |
|---|---|---|---|
| 2,589,288 | 3/1952 | Ryan | 99—7 |
| 326,099 | 9/1885 | Bray | 99—158 |
| 3,036,923 | 5/1962 | Mahon | 99—158 |
| 2,851,356 | 9/1958 | Bedford | 99—18 |
| 3,437,489 | 4/1969 | Arakawa et al. | 99—7 |
| 1,608,832 | 11/1926 | Birdseye | 99—111 |
| 3,099,562 | 7/1963 | Rogers | 99—111 |
| 3,047,395 | 7/1962 | Rusoff et al. | 99—111 |
| 2,560,011 | 7/1951 | Trudel | 99—111 |

FOREIGN PATENTS 663,557    5/1963    Canada.

NORMAN YUDKOFF, Primary Examiner

C. P. RIBANDO, Assistant Examiner

U.S. Cl. X.R.

99—2 R, 18, 111